UNITED STATES PATENT OFFICE.

CHARLES R. HARRIS AND CHRISTOPHER C. BARRICK, OF LOS ANGELES, CALIFORNIA.

FIREPROOF WALL-PLASTER.

SPECIFICATION forming part of Letters Patent No. 708,354, dated September 2, 1902.

Application filed February 27, 1902. Serial No. 95,941. (No specimens.)

*To all whom it may concern:*

Be it known that we, CHARLES R. HARRIS and CHRISTOPHER C. BARRICK, of Los Angeles, in the county of Los Angeles and State of California, have invented certain new and useful Improvements in Composition of Fireproof Wall-Plaster; and we do hereby declare the following to be a full, clear, and exact description of the invention, such as will enable others skilled in the art to which it appertains to make and use the same.

Our invention relates to a composition of fireproof wall-plaster for plastering all character of walls, ceilings, &c., as well as the outside of buildings, ornamental moldings, brackets, &c.

The object of the invention is to produce a composition for these purposes that will possess the requisite tenacity and strength to form a covering of practical indestructibility, but with sufficient pliancy to allow of indentations rather than fracture when coming in contact with hard surfaces.

Our composition consists of the following ingredients, combined in the proportions stated, viz: clay (preferably one-half plastic and one-half fire-clay,) five hundred pounds; calcined plaster, seven hundred pounds; sand, four hundred pounds; hydraulic cement, three hundred and fifty pounds; asbestos, forty pounds; pulverized glue, ten pounds.

The high point of desirability to be obtained in wall-coverings is primarily cheapness, tenacious strength, a non-conductor of heat and cold, electricity and sound, and the assurance of its being able to withstand fire and water when applied to a backing of either wood or iron, also the possibility of being soaked with water and still retaining its strength and color when it again becomes dry. In this composition we have produced a plaster covering all these requirements, still containing no lime or acids. Consequently it can be colored, tinted, or frescoed with the most delicate of tints without any danger whatever of the ingredients contained in the plaster being detrimental to the decorations.

This composition is cheap to manufacture and produces a plaster that is hard and firm, yet not brittle or resonant, and will not warp or crack in drying, even if exposed to wind or sun. It has great adhesive qualities and will adhere to lathed, wired, or plain walls, and of which a complete finish, either rough or smooth, can be produced with a single coat. Again, owing to the fact that it contains a large percentage of clay and sand, two of the cheapest known base materials, it is exceedingly cheap to manufacture. It will spread evenly and easily with the least possible exertion from the mechanic applying it and on account of its composition extra long clenches can be produced without danger of the clenches breaking off, as is so common with many other plasters. It is also susceptible of being molded into any form and is of such toughness that it can be screwed or nailed into position or bored, sawed, or cut similar to wood. It will also be seen that a plaster compounded in the manner set forth can be shipped in its dry state, and, if desired, coloring-matter can be mixed with it in this condition to give the walls or ceilings the tint desired.

The composition of approximately the quantities of the materials named produces the results above named, the calcined plaster, sand, and cement assisting in setting and hardening a large proportion of the clay, while the asbestos-pulp in combination with the glue acts as a binder of the mass, as well as a retarder in preventing too-rapid setting. The asbestos-pulp largely overcomes the tendency of the clay and cement to color the product, and the plaster when dry produces a nearly-white effect. The addition of sand to our composition not only materially cheapens the product, but particularly serves to produce a harder and more granulated surface, whereby it is especially adapted for exterior use.

In manufacturing the plaster for the market we prefer to combine the several ingredients in the proportions above stated. However, experiments have demonstrated the fact that cheap and exceedingly good grades of plaster can be produced by varying the proportions of the several ingredients. For example, the following table illustrates one of the many variations in formula from which the above results may be obtained: clay, four hundred pounds; calcined plaster, four hundred pounds; sand, nine hundred and twenty-five pounds; hydraulic cement, two hundred and fifty pounds; asbestos, twenty pounds; pulverized glue, five pounds. But we would have it understood that we do not confine ourselves to the proportions named, as the invention comprehends the employment of the ingredients named or their equivalents, which will when combined produce a plaster having the characteristics above set forth.

By the term "calcined plaster" we mean raw gypsum, burned and ground.

Having fully described our invention, what we claim as new, and desire to secure by Letters Patent, is—

1. The herein-described composition of matter, consisting of clay, calcined plaster, sand, cement, asbestos and glue, substantially as and for the purpose specified.

2. A new article of manufacture consisting of a dry composition for plaster in powdered form and consisting of clay, calcined plaster, sand, cement, asbestos and glue in substantially the proportions stated.

In testimony whereof we have signed this specification in the presence of two subscribing witnesses.

CHAS. R. HARRIS.
CHRISTOPHER C. BARRICK.

Witnesses:
H. S. G. McCARTNEY,
H. M. CARTER.